(12) United States Patent
Bian et al.

(10) Patent No.: US 12,174,420 B2
(45) Date of Patent: *Dec. 24, 2024

(54) THERMALLY-CONDUCTIVE FEATURES POSITIONED ADJACENT TO AN OPTICAL COMPONENT

(71) Applicant: GlobalFoundries U.S. Inc., Malta, NY (US)

(72) Inventors: Yusheng Bian, Ballston Lake, NY (US); Hemant Dixit, Halfmoon, NY (US); Theodore Letavic, Putnam Valley, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/384,921

(22) Filed: Oct. 30, 2023

(65) Prior Publication Data

US 2024/0061173 A1 Feb. 22, 2024

Related U.S. Application Data

(63) Continuation of application No. 17/679,470, filed on Feb. 24, 2022, now Pat. No. 11,846,804.

(51) Int. Cl.
*G02B 6/122* (2006.01)
*G02B 1/00* (2006.01)
(Continued)

(52) U.S. Cl.
CPC ............... *G02B 6/122* (2013.01); *G02B 1/00* (2013.01); *G02B 6/13* (2013.01); *G02B 6/305* (2013.01);
(Continued)

(58) Field of Classification Search
CPC ........ G02B 6/0026; G02B 6/122; G02B 6/43; G02B 2006/12135
See application file for complete search history.

(56) References Cited

U.S. PATENT DOCUMENTS 4,781,424 A 11/1988 Kawachi et al.
6,847,748 B2 1/2005 Benzoni et al.
(Continued)

FOREIGN PATENT DOCUMENTS

AU 2003278910 A1 5/2004
JP 2007078861 A 3/2007

OTHER PUBLICATIONS

Leech, Patrick et al., "Reactive Ion Etching of CVD Diamond in CF4/O2, O2 and O2/Ar Plasmas," Materials Research Society. Online Proceeding Library Archive. vol. 622. pp. 361-366. 10.1557/PROC-622-T6.36.1 (2000).
(Continued)

*Primary Examiner* — Daniel Petkovsek
(74) *Attorney, Agent, or Firm* — Thompson Hine LLP; Anthony Canale

(57) ABSTRACT

Structures including an optical component and methods of fabricating a structure including an optical component. The structure includes an optical component having a waveguide core, and multiple features positioned adjacent to the waveguide core. The waveguide core contains a first material having a first thermal conductivity, and the features contain a second material having a second thermal conductivity that is greater than the first thermal conductivity.

20 Claims, 4 Drawing Sheets

(51) Int. Cl.
    *G02B 6/13*     (2006.01)
    *G02B 6/30*     (2006.01)
    *G02B 6/12*     (2006.01)

(52) U.S. Cl.
    CPC .............. *G02B 2006/12061* (2013.01); *G02B 2006/121* (2013.01); *G02B 2006/12135* (2013.01)

(56) References Cited

U.S. PATENT DOCUMENTS

| | | | |
|---|---|---|---|
| 9,581,761 B2 | 2/2017 | Liang et al. | |
| 9,711,534 B2 | 7/2017 | Liang et al. | |
| 10,488,587 B2 | 11/2019 | Chantre et al. | |
| 11,709,316 B2 * | 7/2023 | Kim | G02B 6/12002 385/123 |
| 11,846,804 B2 * | 12/2023 | Bian | G02B 6/136 |
| 2011/0186990 A1 * | 8/2011 | Mawatari | H01L 23/481 257/737 |
| 2014/0064658 A1 | 3/2014 | Ramaswamy et al. | |
| 2014/0095121 A1 | 4/2014 | Barowski et al. | |
| 2018/0323575 A1 | 11/2018 | Caër et al. | |
| 2023/0236361 A1 | 7/2023 | Dixit et al. | |
| 2023/0266529 A1 | 8/2023 | Dixit et al. | |
| 2023/0266533 A1 | 8/2023 | Letavic et al. | |

OTHER PUBLICATIONS

K. Giewont et al., "300-mm Monolithic Silicon Photonics Foundry Technology," in IEEE Journal of Selected Topics in Quantum Electronics, vol. 25, No. 5, pp. 1-11, Art No. 8200611, doi: 10.1109/JSTQE.2019.2908790 (Sep.-Oct. 2019).

Y. Bian et al., "Monolithically integrated silicon nitride platform," 2021 Optical Fiber Communications Conference and Exhibition (OFC), pp. 1-3 (2021).

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group), paper FW5D.2 (2020).

M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group), paper T3H.3 (2020).

C. Dory et al., "Inverse-designed diamond photonics," Nature Communications, 10, 3309. https://doi.org/10.1038/s41467-019-11343-1 (2019).

R. R. Grote et al., "Single-mode optical waveguides on native high-refractive-index substrates," APL Photonics 1, pp. 071302-1-071302-6; https://aip.scitation.org/doi/10.1063/1.4955065 (2016).

German Patent and Trademark Office, Office Action issued in German Patent Application No. 102023101217.7 on Feb. 22, 2024; 7 pages.

* cited by examiner

THERMALLY-CONDUCTIVE FEATURES POSITIONED ADJACENT TO AN OPTICAL COMPONENT

CROSS-REFERENCE TO RELATED APPLICATIONS

This application is a continuation of application Ser. No. 17/679,470, filed Feb. 24, 2022 and now U.S. Pat. No. 11,846,804, which is hereby incorporated by reference herein in its entirety.

BACKGROUND

The disclosure relates to photonics chips and, more specifically, to structures including an optical component and methods of fabricating a structure including an optical component.

Photonics chips are used in many applications and systems including, but not limited to, data communication systems and data computation systems. A photonics chip integrates optical components, such as waveguides, photodetectors, modulators, and optical power splitters, and electronic components, such as field-effect transistors, into a unified platform. Among other factors, layout area, cost, and operational overhead may be reduced by the integration of both types of components on the same chip.

An edge coupler, also known as a spot-size converter, is commonly used for coupling light of a given mode from a light source, such as a laser or an optical fiber, to optical components on the photonics chip. The edge coupler may include a section of a waveguide core that defines an inverse taper having a tip. In the edge coupler construction, the narrow end of the inverse taper provides a facet at the tip that is positioned adjacent to the light source, and the wide end of the inverse taper is connected with another section of the waveguide core that routes the light to the optical components of the photonics chip.

The gradually-varying cross-sectional area of the inverse taper supports mode transformation and mode size variation associated with mode conversion when light is transferred from the light source to the edge coupler. The tip of the inverse taper is unable to fully confine the incident mode received from the light source because the cross-sectional area of the tip is considerably smaller than the mode size. Consequently, a significant percentage of the electromagnetic field of the incident mode is distributed about the tip of the inverse taper. As its width increases, the inverse taper can support the entire incident mode and confine the electromagnetic field.

Conventional edge couplers may be susceptible to irreversible power-related damage because of poor power handling capability, which adversely impacts reliability. Particularly susceptible to power-related damage are edge couplers that include silicon waveguide cores. At high optical input powers, non-linear absorption effects in silicon waveguide cores may result in severe thermal heating and even physical melting of the waveguide core due to excessively high temperatures.

Improved structures including an optical component and methods of fabricating a structure including an optical component are needed.

SUMMARY

In an embodiment of the invention, a structure comprises an optical component including a waveguide core and a plurality of features adjacent to the waveguide core. The waveguide core comprises a first material having a first thermal conductivity, and the plurality of features comprise a second material having a second thermal conductivity that is greater than the first thermal conductivity.

In an embodiment of the invention, a method includes forming an optical component including a waveguide core, and forming a plurality of features adjacent to the waveguide core. The waveguide core comprises a first material having a first thermal conductivity, and the plurality of features comprise a second material having a second thermal conductivity that is greater than the first thermal conductivity.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
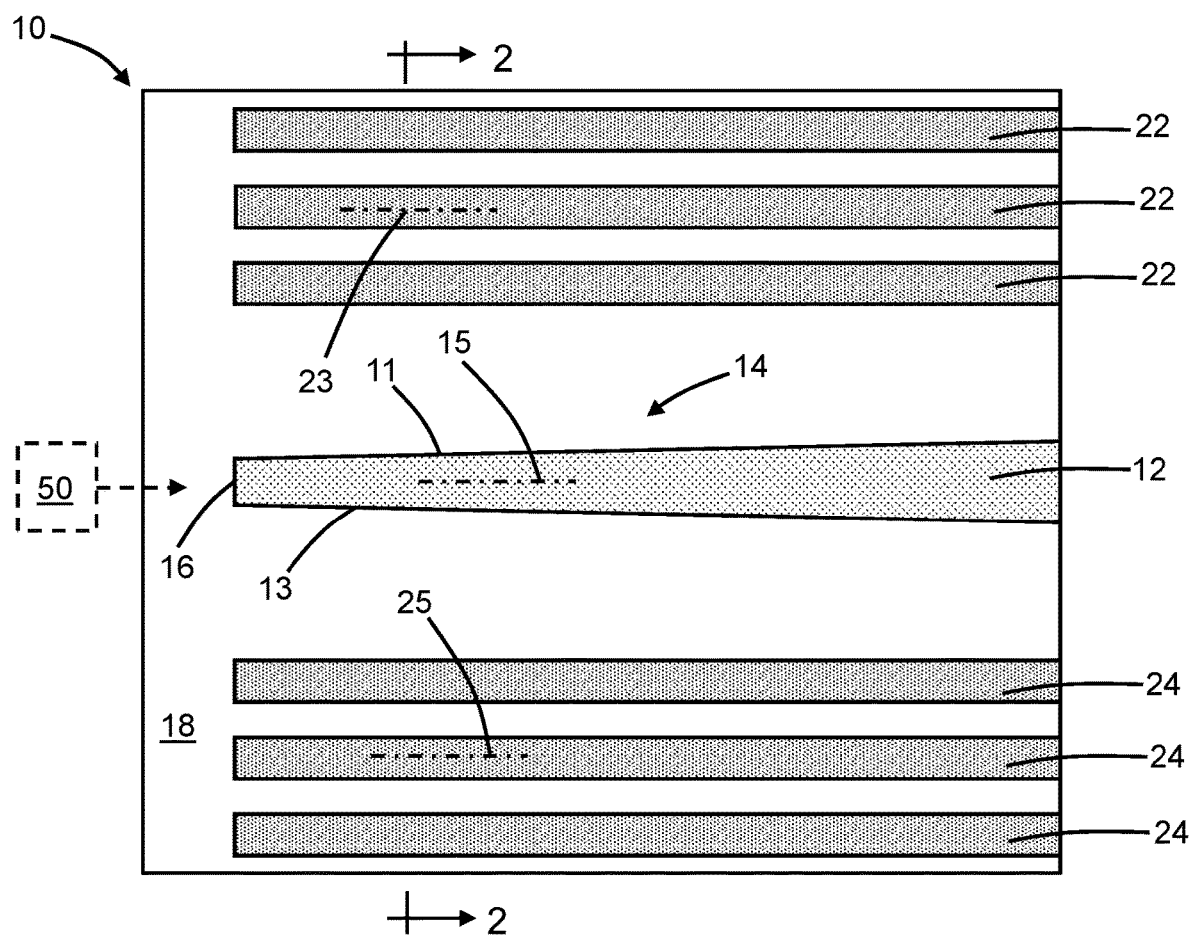
FIG. 1 is a top view of a structure at an initial fabrication stage of a processing method in accordance with embodiments of the invention.
Figure 2:
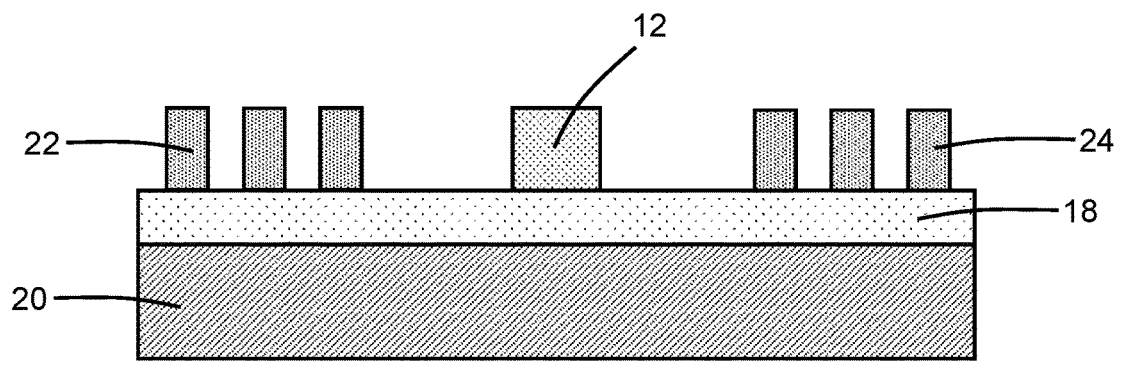
FIG. 2 is a cross-sectional view of the structure taken generally along line 2-2 in FIG. 1.

With reference to FIGS. 1, 2 and in accordance with embodiments of the invention, a structure 10 includes a waveguide core 12 as an optical component or included in an optical component. In a representative embodiment, the waveguide core 12 may be an edge coupler in which the waveguide core 12 has an inverse taper 14 and has an end surface defining a facet 16. The inverse taper 14 increases in width W1 with increasing distance from the facet 16. An inverse taper refers to a tapered section of a waveguide core characterized by a gradual increase in width along a mode propagation direction. The waveguide core 12 may be aligned along a longitudinal axis 15, and the waveguide core 12 may have opposite sidewalls 11, 13 that converge at the facet 16.

The waveguide core 12 may be positioned over a dielectric layer 18 and a substrate 20. In an embodiment, the dielectric layer 18 may be comprised of a dielectric material, such as silicon dioxide, and the substrate 20 comprised of a semiconductor material, such as single-crystal silicon. In an embodiment, the dielectric layer 18 may be a buried oxide layer of a silicon-on-insulator substrate, and the dielectric layer 18 may separate the waveguide core 12 from the substrate 20. The waveguide core 12 may be comprised of a semiconductor material, such as single-crystal silicon. In an embodiment, the waveguide core 12 may be formed by patterning a single-crystal silicon device layer of a silicon-on-insulator substrate with lithography and etching processes, and the dielectric layer 18 may operate as an etch stop when patterning the waveguide core 12.

In the representative embodiment, the waveguide core 12 is embodied in a ridge waveguide core. In an alternative embodiment, the waveguide core 12 may be embodied in a rib waveguide core. In an alternative embodiment, the waveguide core 12 may be embodied in a slot waveguide core. In the representative embodiment, the waveguide core 12 is linear or straight. In an alternative embodiment, the waveguide core 12 may be curved. In an alternative embodiment, the waveguide core 12 may be non-tapered. In embodiments, the waveguide core 12 may be part of an optical component such as a polarization mode converter, an optical coupler, a multi-mode interference region, etc.

Features 22 are positioned in a group adjacent to the sidewall 11 of the waveguide core 12 and have a juxtaposed, spaced-apart arrangement with each other and with the waveguide core 12. Each feature 22 may be aligned along a longitudinal axis 23 and the features 22 may have a parallel arrangement. In an embodiment, the features 22 may be aligned parallel to the waveguide core 12. In an embodiment, the features 22 may have respective bottom surfaces 40 that are adjacent to and/or in direct contact with the dielectric layer 18.

Features 24 are positioned in a group adjacent to the sidewall 13 of the waveguide core 12 and also have a juxtaposed, spaced-apart arrangement with each other and with the waveguide core 12. Each feature 24 may be aligned along a longitudinal axis 25 and the features 24 may have a parallel arrangement. In an embodiment, the features 24 may be aligned parallel to the waveguide core 12. In an embodiment, the features 22 may be aligned parallel to the features 24. In an embodiment, the features 22 and the features 24 may be aligned parallel to the waveguide core 12. In an embodiment, the features 24 may have respective bottom surfaces 41 that are adjacent to and/or in direct contact with the dielectric layer 18.

The features 22, 24 may be comprised of a material that is characterized by a comparatively-high thermal conductivity relative to the waveguide core 12, the dielectric layer 18, and dielectric layers subsequently formed over the waveguide core 12. In an embodiment, the material of the features 22, 24 may be an inorganic material, such as diamond. In an embodiment, the material of the features 22, 24 may be characterized by a thermal conductivity near room temperature that is significantly greater than the thermal conductivity near room temperature of the material constituting the waveguide core 12. In an embodiment, the material of the features 22, 24 may be characterized by a thermal conductivity near room temperature that is significantly greater than the thermal conductivity near room temperature of silicon dioxide (i.e., about 1.3 W/m-K). In an embodiment, the material of the features 22, 24 may be characterized by a thermal conductivity near room temperature that is significantly greater than the thermal conductivity near room temperature of copper (i.e., about 400 W/m-K). In an embodiment, the material of the features 22, 24 may be characterized by a thermal conductivity near room temperature that is significantly greater than the thermal conductivity near room temperature of silicon (i.e., about 150 W/m-K). In an embodiment, the material of the features 22, 24 may be characterized by a thermal conductivity near room temperature that is greater than 1000 W/m-K. For example, the candidate material diamond for the features 22, 24 is characterized by a thermal conductivity near room temperature of about 2000 W/m-K to about 2400 W/m-K. The high thermal conductivity of the material constituting the features 22, 24 promotes heat flow away from the waveguide core 12 such that, during operation, the operating temperature of the waveguide core 12 is reduced.

In an embodiment, the features 22, 24 may be formed by depositing a layer of their constituent material by chemical vapor deposition and patterning the deposited layer by lithography and etching processes. In an embodiment, the features 22, 24 may have a width W2 ranging from about 10 nanometers to about 200 nanometers. In an embodiment, the width W2 of the features 22, 24 may provide a sufficient thermal mass to support the spreading of heat away from the waveguide core 12. In an embodiment, the features 22, 24 may have a uniform thickness. In the representative embodiment, the features 22, 24 have linear or straight shapes. In an alternative embodiment, the features 22, 24 may have non-linear or curved shapes. In an embodiment, the pitch and duty cycle of the features 22 and the features 24 may be uniform. In alternative embodiments, the pitch and the duty cycle of the features 22 and the features 24 may be apodized (i.e., non-uniform).

Figure 3:
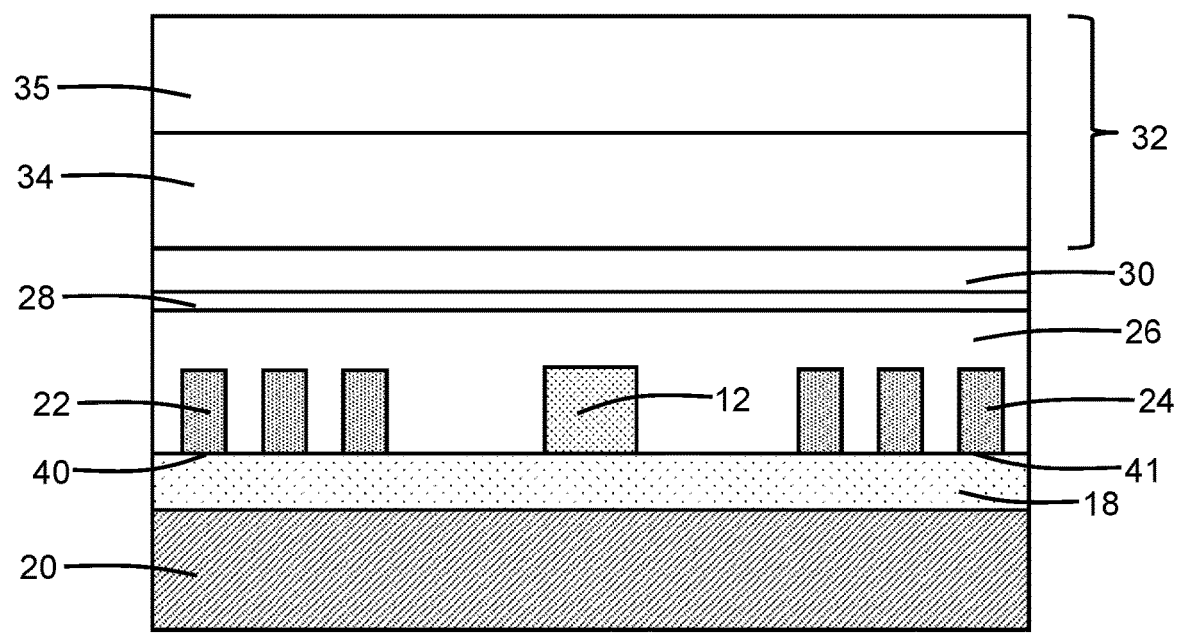
FIG. 3 is a cross-sectional view of the structure at a fabrication stage of the processing method subsequent to FIG. 2.

With reference to FIG. 3 in which like reference numerals refer to like features in FIGS. 1, 2 and at a subsequent fabrication stage, dielectric layers 26, 28, 30 are formed in a layer stack over the waveguide core 12, dielectric layer 18, and features 22, 24. The dielectric layer 26 and the dielectric layer 30 may be comprised of a dielectric material, such as silicon dioxide, and the dielectric layer 28 may be comprised of a dielectric material, such as silicon nitride. In an alternative embodiment, the dielectric layer 28 may be omitted from the layer stack. In an embodiment, the material of the features 22, 24 may be characterized by a thermal conductivity near room temperature that is significantly greater than the thermal conductivity near room temperature of the materials constituting the dielectric layers 26, 28, 30.

The features 22, 24 are embedded in the dielectric layer 26 such that the dielectric material of the dielectric layer 26 occupies the spaces between the features 22 and the spaces between the features 24. The features 22 and the dielectric material of the dielectric layer 26 filling the spaces between the features 22 may define a metamaterial that can be treated as an effective homogeneous material having an effective refractive index intermediate between the refractive index of the material constituting the features 22 and the refractive index of the dielectric material of the dielectric layer 26. The features 24 and the dielectric material of the dielectric layer 26 filling the spaces between the features 24 may also define a metamaterial that can be treated as an effective homogeneous material having an effective refractive index intermediate between the refractive index of the material constituting the features 24 and the refractive index of the dielectric material of the dielectric layer 26.

A back-end-of-line stack 32 may be formed over the dielectric layers 26, 28, 30. The back-end-of-line stack 32 may further include additional interlayer dielectric layers 34 each comprised of a dielectric material, such as silicon dioxide or silicon nitride.

Light (e.g., laser light) may be directed from a light source 50 (FIG. 1) toward the facet 16 of the waveguide core 12. The light may have a given wavelength, intensity, mode shape, and mode size, and the edge coupler providing the representative optical component may provide spot size conversion for the light. For example, the light source 50 may be a semiconductor laser, and the semiconductor laser may be positioned inside a cavity formed in the substrate 20 and attached to the substrate 20.

The features 22, 24 may act as a heat spreader for dissipating heat generated in the waveguide core 12 during operation, while imparting a minimum perturbation on the optical mode of the laser light being guided by the waveguide core 12 and on the light-guiding properties of the waveguide core 12. The features 22, 24 may be effective to prevent permanent damage to the waveguide core 12 arising from high-power laser light, such as laser light in a power range of 100 milliwatts to 200 milliwatts. For example, the features 22, 24 may effectively mitigate hotspots in the waveguide core 12 caused by high-power laser light such that the waveguide core 12 can operate at a temperature that is less than an acceptable temperature limit. The features 22, 24 may be particularly effective in providing cooling for a silicon waveguide core 12 that experiences elevated heating due to non-linear light absorption at high powers. The features 22, 24 may relax restrictions on the laser power level and may lead to fewer limitations on system-level performance. The features 22, 24 may also reduce bending loss if the waveguide core 12 and features 22, 24 are curved. The heterogenous materials (e.g., features 22, 24 alternating laterally with a material of a different composition provided by portions of the dielectric layer 26 in the spaces between the features 22, 24) may permit a reduction in the footprint of an optical component (e.g., the waveguide core 12) designed to handle light of transverse electric mode by enhancing confinement and other mode properties.

The structure 10, in any of its embodiments described herein, may be integrated into a photonics chip that includes electronic components and additional optical components. For example, the electronic components may include field-effect transistors that are fabricated by CMOS processing.

Figure 4:
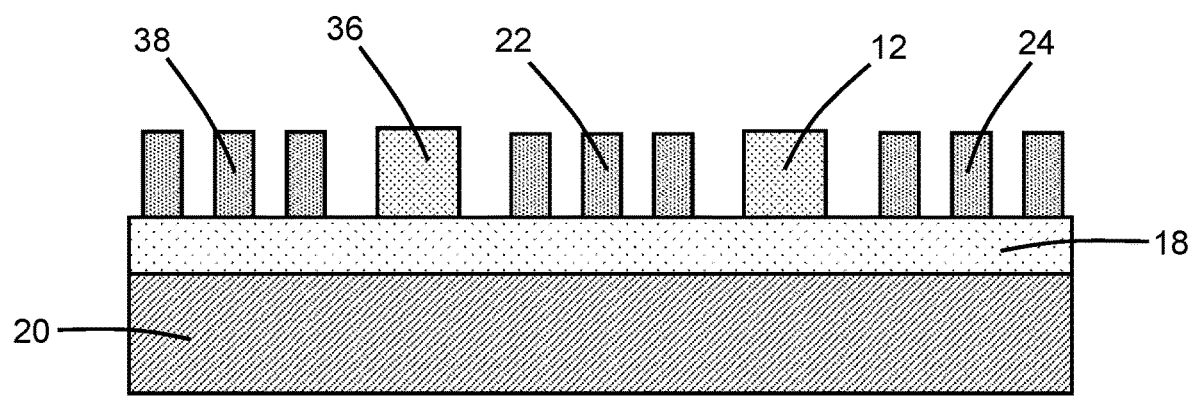
FIG. 4 is a cross-sectional view of a structure in accordance with alternative embodiments of the invention.

With reference to FIG. 4 and in accordance with alternative embodiments of the invention, the features 22 may be laterally positioned between the waveguide core 12 and a waveguide core 36 adjacent to the waveguide core 12. Features 38 similar to the features 24 may be laterally positioned adjacent to an opposite side of the waveguide core 36 from the features 22. The features 22 may reduce or prevent cross-talk between the waveguide core 12 and the waveguide core 36 by, for example, controlling the evanescent field of light propagating in the waveguide core 12. As a consequence, the waveguide cores 12, 36 may be placed closer together in a more compact arrangement than the arrangement in the absence of the features 22. As previously described, the dielectric layers 26, 28, 30 and back-end-of-line stack 32 may be subsequently formed over the waveguide cores 12, 36 and features 22, 24, 38.

Figure 5:
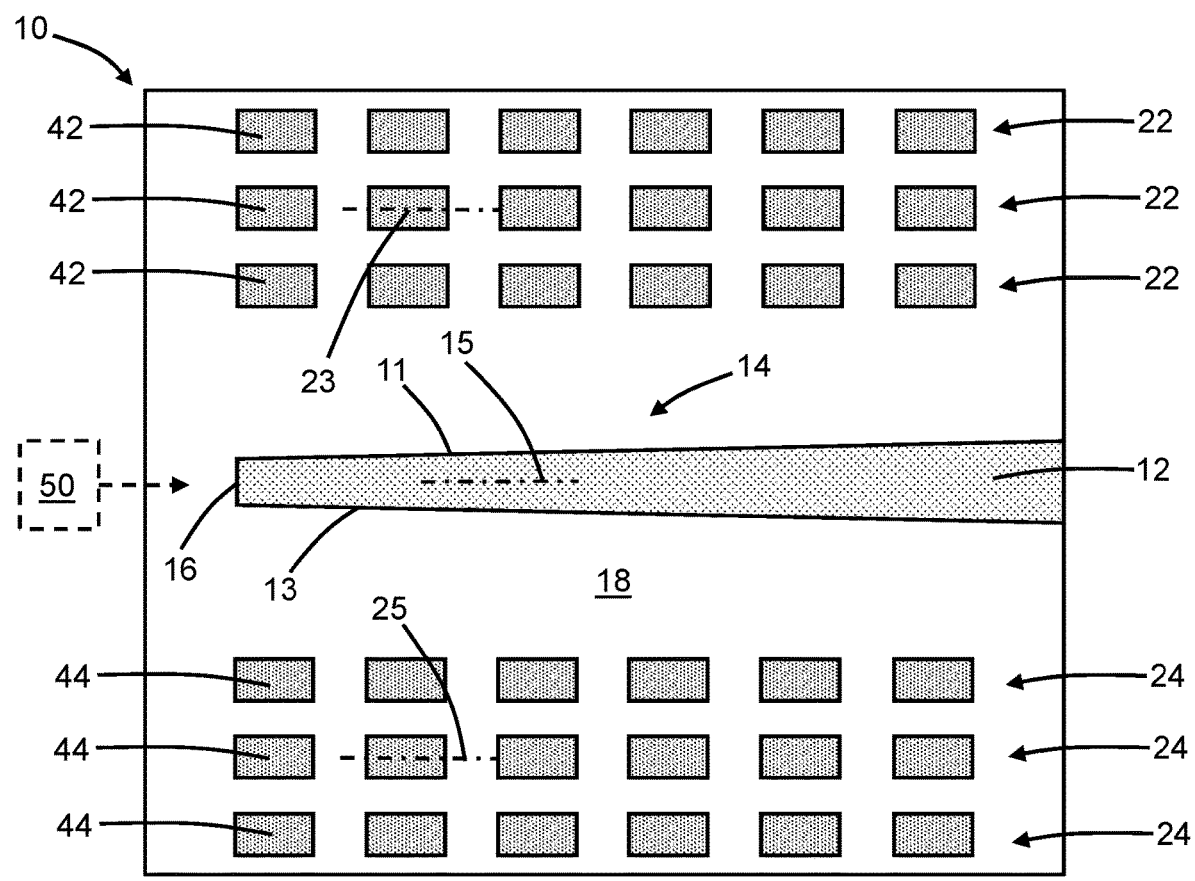
FIG. 5 is a top view of a structure in accordance with alternative embodiments of the invention.

With reference to FIG. 5 and in accordance with alternative embodiments of the invention, the features 22 may be partitioned into rows of segments 42, and the features 24 may likewise be partitioned into rows of segments 44. The segments 42 in each row have a spaced arrangement along the longitudinal axis 23. The segments 44 in each row have a spaced arrangement along the longitudinal axis 25. In an alternative embodiment, the waveguide core 12 and the features 22, 24 may be curved in the same direction and the features 22, 24 may be respectively segmented into the rows of segments 42, 44. The segments 42 in the different rows may also be arranged in columns to define a two-dimensional array. Similarly, the segments 44 in the different rows may also be arranged in columns to define a two-dimensional array.

Figure 6:
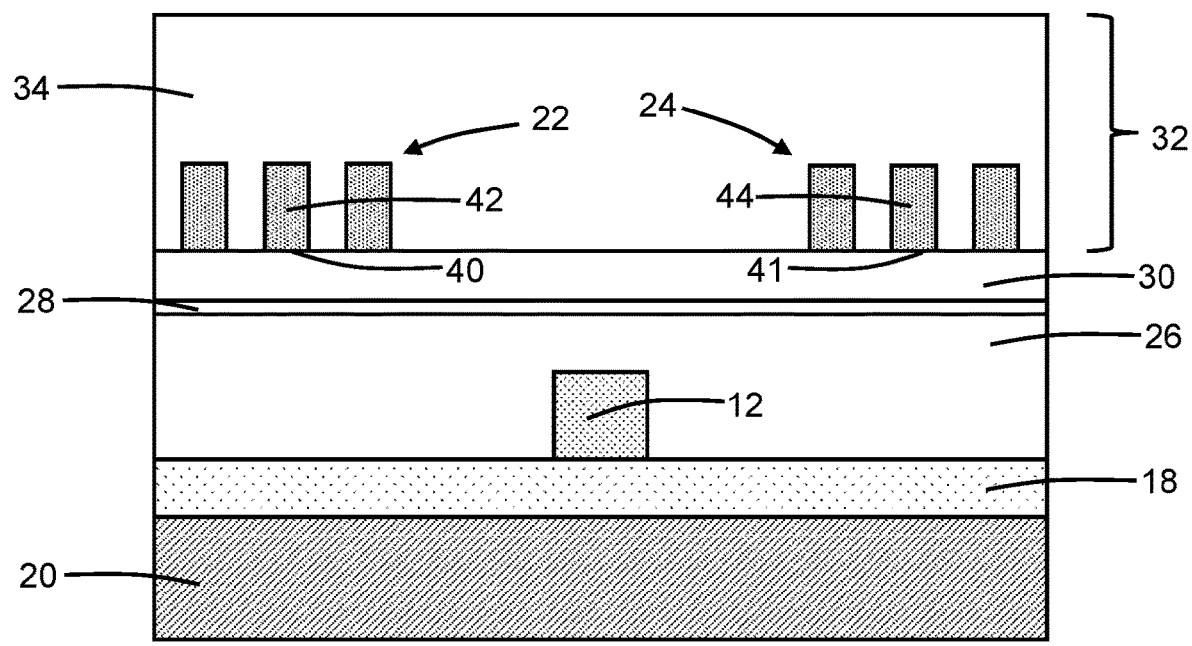
FIG. 6 is a cross-sectional view of a structure in accordance with alternative embodiments of the invention.

With reference to FIG. 6 and in accordance with alternative embodiments of the invention, the features 22 and the features 24 may be relocated to a position over the waveguide core 12 and in a different elevational level relative to the substrate 20 than the waveguide core 12. The waveguide core 12 is positioned in a vertical direction between the substrate 20 and the features 22, 24. In that regard, the bottom surfaces 40 of the features 22 and the bottom surfaces 41 of the features 24 are spaced in a vertical direction above the waveguide core 12. In an alternative embodiment, the features 22, 24 may be respectively divided into the rows of segments 42, 44.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
 an optical component including a first waveguide core, the first waveguide core comprising a first material having a first thermal conductivity;

a plurality of features adjacent to the first waveguide core, the plurality of features comprising a second material having a second thermal conductivity that is greater than the first thermal conductivity; and a first dielectric layer comprising a dielectric material, the first dielectric layer positioned between the plurality of features and the optical component, and the dielectric material disposed in spaces between the plurality of features to define a metamaterial structure, wherein the first material is silicon, and the second material is diamond.

2. The structure of claim 1 wherein the first waveguide core is aligned along a first longitudinal axis, and each of the plurality of features is aligned along a second longitudinal axis that is parallel to the first longitudinal axis.

3. The structure of claim 1 further comprising:

a second waveguide core, wherein the plurality of features are laterally positioned between the first waveguide core and the second waveguide core.

4. The structure of claim 3 wherein the first waveguide core is aligned along a first longitudinal axis, and each of the plurality of features is aligned along a second longitudinal axis that is parallel to the first longitudinal axis.

5. The structure of claim 4 wherein each of the plurality of features has a linear shape.

6. The structure of claim 1 wherein the first waveguide core includes a sidewall, and the plurality of features include a plurality of segments arranged in a first two-dimensional array adjacent to the sidewall.

7. The structure of claim 1 further comprising:

a substrate; and a second dielectric layer positioned between the substrate and the optical component, wherein the optical component is positioned on the second dielectric layer, and the plurality of features are disposed in direct contact with the second dielectric layer.

8. The structure of claim 1 further comprising:

a substrate; and a second dielectric layer positioned between the substrate and the optical component, wherein the optical component is positioned on the second dielectric layer, and the optical component is positioned between the substrate and the plurality of features.

9. The structure of claim 8 wherein the dielectric material is silicon dioxide, the second dielectric layer comprises silicon dioxide, and the first material is silicon.

10. The structure of claim 1 wherein the first waveguide core includes an inverse taper having an end surface, a first sidewall, and a second sidewall, the inverse taper increases in width with increasing distance from the end surface, and the first sidewall and the second sidewall converge at the end surface.

11. The structure of claim 10 further comprising:

a light source configured to direct light toward the end surface of the first waveguide core.

12. The structure of claim 10 wherein the plurality of features are positioned in a group adjacent to the first sidewall with a juxtaposed, spaced-apart arrangement.

13. The structure of claim 10 wherein the plurality of features include a plurality of segments that are arranged in a first two-dimensional array adjacent to the first sidewall.

14. The structure of claim 1 further comprising:

a substrate, wherein the plurality of features are disposed in a different elevational level relative to the substrate than the first waveguide core, and the first waveguide core is positioned between the plurality of features and the substrate.

15. The structure of claim 1 wherein the optical component comprises an edge coupler.

16. A method comprising:

forming an optical component including a first waveguide core, wherein the first waveguide core comprises a first material having a first thermal conductivity;

forming a plurality of features adjacent to the first waveguide core, wherein the plurality of features comprising a second material have a second thermal conductivity that is greater than the first thermal conductivity; and forming a dielectric layer comprising a dielectric material, wherein the dielectric layer is positioned between the plurality of features and the optical component, and the dielectric material is disposed in spaces between the plurality of features to define a metamaterial structure, wherein the first material is silicon, and the second material is diamond.

17. The method of claim 16 wherein each of the plurality of features is formed with a plurality of segments aligned in a row along a longitudinal axis.

18. The method of claim 16 wherein the first waveguide core is aligned along a first longitudinal axis, and each of the plurality of features is aligned along a second longitudinal axis that is parallel to the first longitudinal axis.

19. The method of claim 16 further comprising:

forming a second waveguide core, wherein the plurality of features are laterally positioned between the first waveguide core and the second waveguide core.

20. The method of claim 16 wherein the optical component comprises an edge coupler.

* * * * *